(12) United States Patent
Baumann

(10) Patent No.: US 6,935,616 B2
(45) Date of Patent: Aug. 30, 2005

(54) BALANCED PLUG VALVE

(76) Inventor: Hans D. Baumann, 32 Pine St., Rye, NH (US) 03870

( * ) Notice: Subject to any disclaimer, the term of this patent is extended or adjusted under 35 U.S.C. 154(b) by 155 days.

(21) Appl. No.: 10/622,169

(22) Filed: Jul. 18, 2003

(65) Prior Publication Data
US 2005/0012065 A1 Jan. 20, 2005

(51) Int. Cl.$^7$ ................................................ F16K 51/00
(52) U.S. Cl. .................. 251/282; 137/614.18; 251/121; 251/214; 251/325; 251/330
(58) Field of Search ................................. 251/325, 282, 251/121, 122, 214, 330; 137/614.18

(56) References Cited

U.S. PATENT DOCUMENTS

| | | | | |
|---|---|---|---|---|
| 208,986 A | * | 10/1878 | Patterson | ............... 137/614.18 |
| 2,370,371 A | * | 2/1945 | Pratt et al. | ................... 251/325 |
| 3,761,053 A | * | 9/1973 | Bedo et al. | .................. 251/122 |
| 3,873,063 A | * | 3/1975 | Illing | ......................... 251/282 |
| 6,047,718 A | * | 4/2000 | Konsky et al. | ......... 137/614.18 |
| 6,089,255 A | * | 7/2000 | Bonnefous et al. | ..... 137/614.18 |
| 6,494,229 B2 | * | 12/2002 | Kajitani | ...................... 251/122 |

* cited by examiner

Primary Examiner—John Bastianelli

(57) ABSTRACT

A balanced plug valve having substantially reduced shut-off force requirements due to an integral dual seating arrangement of the valve plug within a valve housing having slanted inlet and outlet ports and wherein the inlet port forms an elliptical opening for fluid control which is selectively exposed by a cylindrical portion of a sliding valve plug.

11 Claims, 2 Drawing Sheets

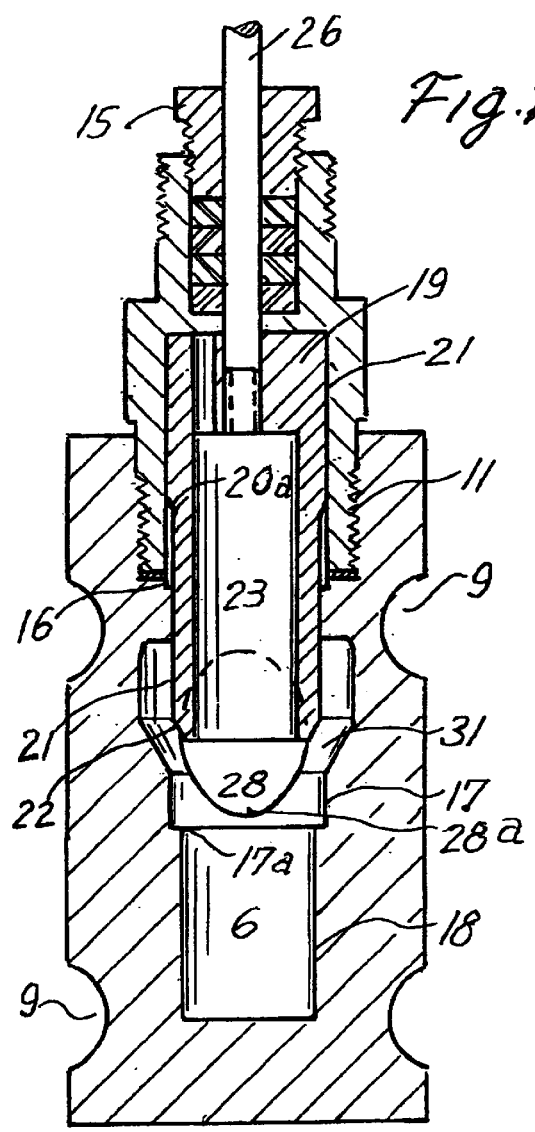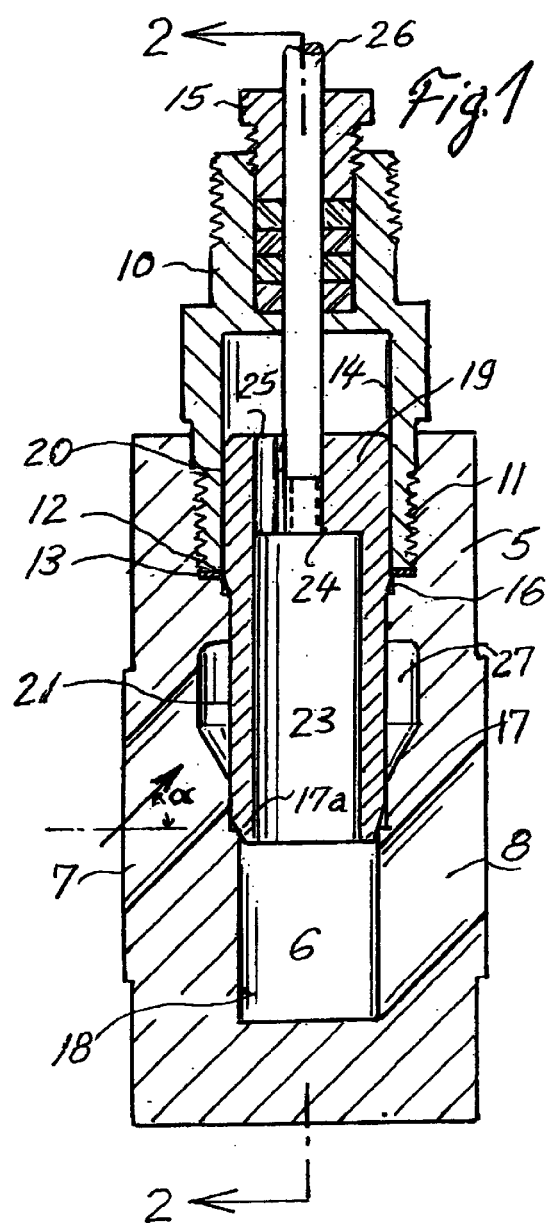

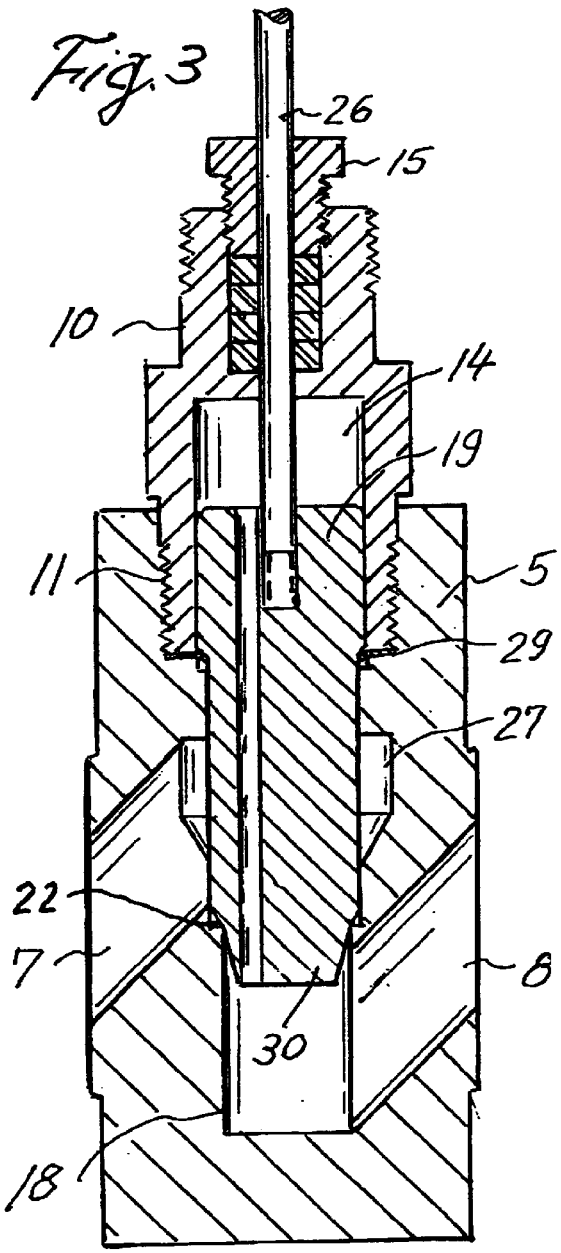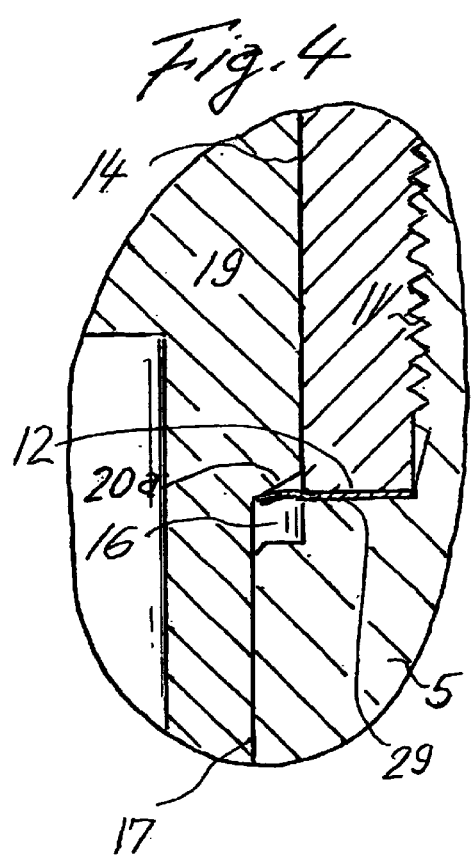

BALANCED PLUG VALVE

TECHNICAL FIELD

The control valve described herein makes known an apparatus enabling the control of high-pressure fluids without the requirements of excessive actuator forces, by providing a low cost balanced plug and without resorting to expensive and more difficult cages and seat rings.

BACKGROUND

Control valves are commonly used to control the fluid passing through a pipe. As known to those skilled in the art, a control valve regulates the rate of fluid flow as the position of the valve plug is changed by an actuator. There are three important features of a control valve, such as a globe valve, that it must contain the fluid without external leakage, that it must be able to withstand the pressure and temperature of the fluid, and that the fluid forces acting on the plug should not cause instability nor prevent the plug from shutting the valve off.

Quite often control valves have to perform under elevated pressure and temperature conditions. While valves with a single seat shut-off configuration and an un-balanced plug provide good service in these applications, they do require substantial forces that have to be provided by an actuator in order to overcome the effects of high fluid pressure acting on such un-balanced plug surfaces. For example, a one inch valve plug needs more than 800 lbs force to close against 1000 psi fluid pressure.

Such actuator force requirements can be quite expensive and such valves face other problems such as stability of operation. A typical example of such a single seated valve is shown in U.S. Pat. No. 4,474,356.

One typical way of alleviating these problems in prior art is the use of a cage with dual seating surfaces for the plug. My prior inventions, shown in U.S. Pat. Nos. 6,536,472 B2 and 3,805,839, describe such a solution. While capable of performing the required tasks, this is a very expensive solution due to the extra, precision machined, parts and due to the extra heavy bonnet bolting that is required to lock the cage within the valve housing. Finally, these valves have an additional problem of absorbing thermal expansion of the cage, especially if cage and housing have to be made of different materials.

SUMMARY

The object of my invention is a control valve assembly of low cost and compact configuration, requiring neither cage nor seat rings A further object is to provide for substantial balancing of fluid pressure acting on the valve plug thereby eliminating the need for larger and expensive actuating devices. Yet another object of my invention is to provide a control valve with parts that can be made from similar materials and, utilizing the use of one flexible valve seat, can overcome the adverse effects of thermal expansion on the sealing capabilities of the valve plug.

In accordance with another aspect of my invention, a gradual enlarging flow passage provides a desired flow characteristic by utilizing the elliptical opening of a slanted inlet port co-operating with a cylindrical portion of the valve plug.

BRIEF DESCRIPTION OF THE DRAWINGS

FIG. 1 is a central, cross-sectional view of a preferred embodiment of my invention.

FIG. 2 is a cross-sectional side view of the invention depicted in figure one and taken along the lines 2—2.

FIG. 3 is a central, cross-sectional view illustrating a flexible upper seating arrangement, and where the valve plug incorporates a lower, contoured portion.

FIG. 4 is an enlarged, partial, cross-sectional view of the elastic seating arrangement.

DETAILED DESCRIPTION

Referring to FIG. 1, my balanced plug valve comprises a housing 5 preferably made from stainless steel, and having a central bore 6, a slanted inlet port 7, and a slanted outlet port 8. Both ports intersect said central bore 6. The angle of the slant is dependent on the size of the housing and its width. Typical slant angles α are 30 degrees to 50 degrees. Housing 5 is configured to fit between a pair of pipeline flanges. Suitable indentations 9 are provided to accommodate bolts required to clamp the housing 5 between said flanges. A bonnet is threaded into the upper portion 11 of housing 5. Said bonnet furthermore has a lower, flattened surface 12 engaging a similar configured portion within the housing and retained there between a suitable gasket 13.

Bonnet 10 features a hollow indenture 14 and an adjustable packing box 15.

Central bore 6 has a number of stepped diameter portions 16, 17, and 18 respectively and wherein the intersection between diameter 17 and 18 constitutes a lower seating surface 17a straddling the inlet port 7 and the outlet port 8.

A slide able valve plug 19 made from a hard stainless steel, or, having a chrome plated surface, and having a larger diameter portion 20, engaging indentation 14 and diameter portion 16. Said plug 19 furthermore has a lower, reduced diameter 21 closely fitting within diameter portions 17, and having a beveled portion 22 capable of sealingly engaging the seating surface 17a. The plug furthermore has a central bore 23, an upper threaded bore 24, and a fluid conducting opening 25. The intersection 20a between diameters 20 and 21 likewise is beveled and sealingly engages the corner of diameter portions 14 and 16 when the plug is in its lowest sliding position.

A valve stem 26 whose lower end is fastened to the threaded portion 24 of plug 19 while the upper end is able to attach to an actuating device (not part of the invention) after passing through packing box 15.

Finally, there is an enlarged fluid collecting void 27 commencing at a distance of about one-third the diameter of inlet port 7 along diameter portion 17 and extending from there to a point of intersection with the upper surface of inlet port 7.

As can be seen in FIG. 2, the terminating opening 28 of inlet port 7 has the general shape of an ellipse which is partially uncovered by the cylindrical diameter 21 of plug 19 when in the highest sliding position, as shown in FIG. 2.

FIG. 3 represents a modified version of my invention wherein gasket 13 is replaced by a flat metal washer 29, preferably made from hardened stainless steel or of a high nickel alloy. This washer has a reduced diameter which is only slightly larger than diameter portion 17 and which is able to contact intersection 20a when the plug 19 is in the lowest position. Notice that the inner circumference of washer 29 is able to deflect somewhat after contact by intersection 20a. This will enable washer 29 to absorb a sudden differential expansion of plug 19 following the admission of hot fluid in to my valve. The plug configuration shown in FIG. 3 furthermore has a lower, terminating profiled portion 30 closely engaging diameter portion 18 of housing 5. This configuration is advantageous when a different flowing area characteristic is desired than the one provided by area 28.

The functioning of my valve is as follows: Fluid coming from a piping system enters port 7 and from there flows into void 27. Further fluid flow is prevented when the plug 19 is in the lowest sliding position by sealing contact surfaces at 17a and 26. Note, that hydrostatic forces generated by the fluid are minimized since only the area between diameter 20 and 21 are subjected to pressure. These generated minor forces are directed towards opening of the plug, therefore contributing to the dynamic stability of the plug. However fluid flow will commence once plug 19 will begin to lift off the seats. Here fluid flow will commence very gradually, since only a small portion 28a of inlet port 7 becomes exposed. The width and therefore the flow area of 28a becomes progressively larger with increased plug travel till finally the lower seating surface of plug 19 disengages from diameter portion 17 and therefore adds an additional flow area 31 allowing additional fluid to pass from void 27 into diameter portion 18 and from there into outlet port 8. This gradual opening of the flow areas with plug travel is highly desirable for automatic control purposes. However, the additional contour portion 30 may be employed if a special characteristic is desired.

Fluid is able to communicated freely between lower diameter portion 18 and area 14 once the plug is unseated in order to maintain the nearly complete balance of fluid forces acting on plug 19.

While the invention has been explained in preferred configurations, the description is not intended to be construed in a limiting sense. Various modifications and combinations will be apparent to those skilled in the art. For example, the bonnet may be attached by suitable bolting instead of being threaded. Also, it is foreseen that the housing may incorporate flanges able to connect to similar flanges of a piping system. It is also foreseen that the inlet and outlet ports may be threaded in order to connect to the piping and that the direction of flow might be reversed from that shown.

Finally, the stem seal may be in form of a bellows instead of a packing box.

What is claimed is:

1. A balanced plug valve comprising a housing having fluid conducting inlet and outlet ports and an upper terminating surface, said housing having an essentially central, vertical bore incorporating a number of stepped diameter portions one of which straddles said inlet and outlet ports and forming a first seating surface and where a second stepped diameter provides for a second seating surface, a valve plug slidingly arranged within said vertical bore and having stepped diameter portions capable of engaging said first and second seating surfaces when in the lowest sliding position, a bonnet having a lower, flat terminating surface and being suitably fastened near the upper terminating surface of said housing and furthermore being capable of preventing fluid egress from said housing bore, and means to motivate said valve plug, a thin, flexible metal washer is placed under said flat, terminating surface of the bonnet, and having an internal diameter somewhat smaller than that of the adjacent housing bore, and being capable of forming said second seating surface.

2. A balanced plug valve according to claim 1, wherein said plug having one or more vertical bores capable of communicating fluid from below said first seating surface to an area above said second seating surface.

3. A balanced plug valve comprising a housing having fluid conducting inlet and outlet ports and an upper terminating surface, said housing having an essentially central, vertical bore incorporating a number of stepped diameter portions one of which straddles said inlet and outlet ports and forming a first seating surface and where a second stepped diameter incorporates a second seating surface, a valve plug slidingly arranged within said vertical bore and having stepped diameter portions capable of engaging said first and second seating surfaces when in the lowest sliding position, a bonnet having a lower, flat terminating surface and being suitably fastened near the upper terminating surface of said housing and furthermore being capable of preventing fluid egress from said housing bore, and means to motivate said valve plug, one of the ports of the housing is configured at an angle of between 30 and 50 degrees to the horizontal axis and intersecting one of the stepped diameter bores of said housing providing thereby an essentially elliptical opening which is partially exposed by said valve plug when in its highest travel position.

4. A balanced plug valve according to claim 3, wherein the flat terminating surface of said bonnet furthermore engages a complimentary configuration near the upper terminating end of said housing.

5. A balanced plug valve according to claim 4, where a gasket is located below said flat, terminating surface of said bonnet.

6. A balanced plug valve according to claim 1, wherein said valve plug has a lower, terminating contoured configuration capable of forming a variable restriction for fluid flow passing between said inlet and outlet ports.

7. A balanced plug valve according to claim 1, wherein said means to motivate the valve plug consists of a cylindrical valve stem, whose lower end is suitably fastened to the plug and whose upper end extends through said bonnet.

8. A balanced plug valve according to claim 7, wherein said bonnet incorporates an adjustable packing portion capable of sealing said valve stem.

9. A balanced plug valve according to claim 1, wherein the stepped diameter portion of said housing bore located above said first seating surface is capable of providing a close-fit guiding surface for said sliding valve plug throughout a major portion of its sliding travel.

10. A balanced plug valve according to claim 1, wherein said bonnet has a threaded exterior engaging a similar threaded opening within the upper terminating surface of said housing.

11. A balanced plug valve according to claim 3, wherein said valve plug has a lower, terminating contoured configuration capable of forming a variable restriction for fluid flow passing between said inlet and outlet ports.

* * * * *